United States Patent
Ranki et al.

(10) Patent No.: US 9,383,431 B2
(45) Date of Patent: Jul. 5, 2016

(54) DIRECTIONAL POSITIONING AUGMENTED BY PROXIMITY INFORMATION

(75) Inventors: Ville Valtteri Ranki, Jorvas (FI); Antti Paavo Tapani Kainulainen, Nummela (FI); Fabio Belloni, Espoo (FI); Kimmo Juhana Kalliola, Espoo (FI)

(73) Assignee: Nokia Technologies Oy, Espoo (FI)

( * ) Notice: Subject to any disclaimer, the term of this patent is extended or adjusted under 35 U.S.C. 154(b) by 87 days.

(21) Appl. No.: 14/122,817

(22) PCT Filed: Jun. 1, 2012

(86) PCT No.: PCT/IB2012/052780
§ 371 (c)(1),
(2), (4) Date: Jan. 28, 2014

(87) PCT Pub. No.: WO2012/164540
PCT Pub. Date: Dec. 6, 2012

(65) Prior Publication Data
US 2014/0194141 A1   Jul. 10, 2014

Related U.S. Application Data

(60) Provisional application No. 61/492,965, filed on Jun. 3, 2011.

(51) Int. Cl.
*H04W 24/00* (2009.01)
*G01S 5/02* (2010.01)
*G01S 5/12* (2006.01)

(52) U.S. Cl.
CPC .............. *G01S 5/0284* (2013.01); *G01S 5/0263* (2013.01); *G01S 5/12* (2013.01)

(58) Field of Classification Search
CPC ....................................................... G01S 5/0284
See application file for complete search history.

(56) References Cited

U.S. PATENT DOCUMENTS

2006/0052115 A1* 3/2006 Khushu ................. G01S 5/0263
455/456.3

FOREIGN PATENT DOCUMENTS

| EP | 1786143 A2 | 5/2007 |
| WO | 2007145890 A2 | 12/2007 |
| WO | 2009/056150 A1 | 5/2009 |

OTHER PUBLICATIONS

International Search Report and Written Opinion received for corresponding Patent Cooperation Treaty Application No. PCT/IB2012/052780, dated Sep. 28, 2012, 15 pages.

(Continued)

Primary Examiner — Martin Mushambo
(74) Attorney, Agent, or Firm — Locke Lord LLP

(57) ABSTRACT

A system for estimating apparatus position based on different types of positioning information. In at least one example implementation, an apparatus may sense wireless signals (802), and if the wireless signals are determined to comprise angular data meeting a certain criteria (804), the position of the apparatus may be estimated based on the angular data (806). Otherwise, if the apparatus determines that the wireless signals comprise at least one of angular data not meeting the certain criteria (814) or proximity data (816), the position of the apparatus may be estimated based on proximity data derived from the sensed wireless signals (822).

19 Claims, 10 Drawing Sheets

(56) References Cited

OTHER PUBLICATIONS

Kemppi et al., "Hybrid Positioning System Combining Angle-Based Localization, Pedestrian Dead Reckoning and Map Filtering", International Conference on Indoor Positioning and Indoor Navigation (IPIN), Sep. 15-17, 2010, 7 pages.

Papapostolou et al., "Exploiting Multi-Modality and Diversity for Localization Enhancement: WiFi & RFID Usecase", IEEE 20th International Symposium on Personal, Indoor and Mobile Radio Communication (PIMRC), Sep. 13-16, 2009, 5 pages.

Abdat, M. et al., "Survey on Indoor Wireless Positioning Techniques: Towards Adaptive Systems", International Conference on Distributes Framework and Applications (DFmA), Aug. 2-3, 2010, 5 pages.

Extended European Search Report received for corresponding European Patent Application No. 12793270.5, dated Feb. 4, 2015, 7 pages.

* cited by examiner

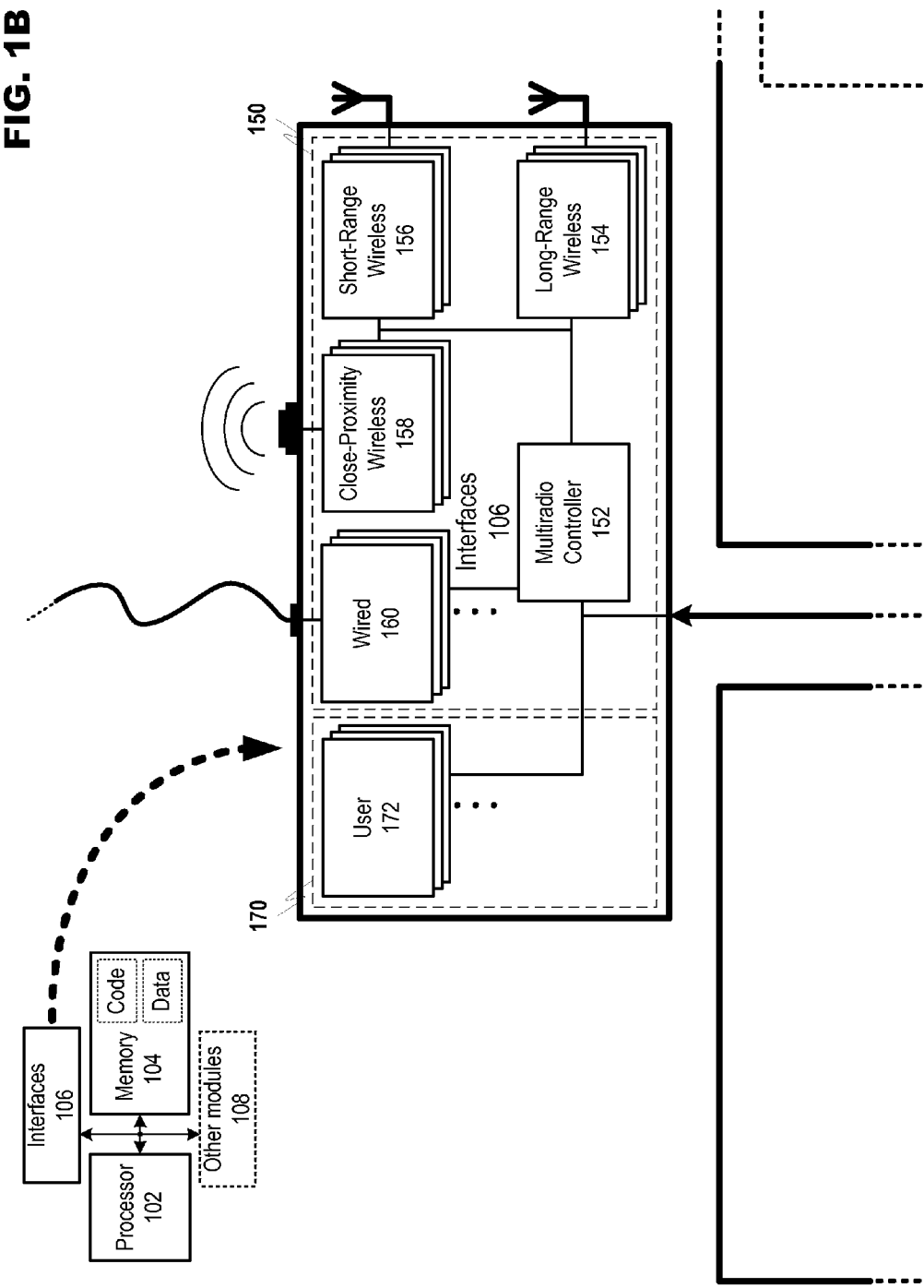

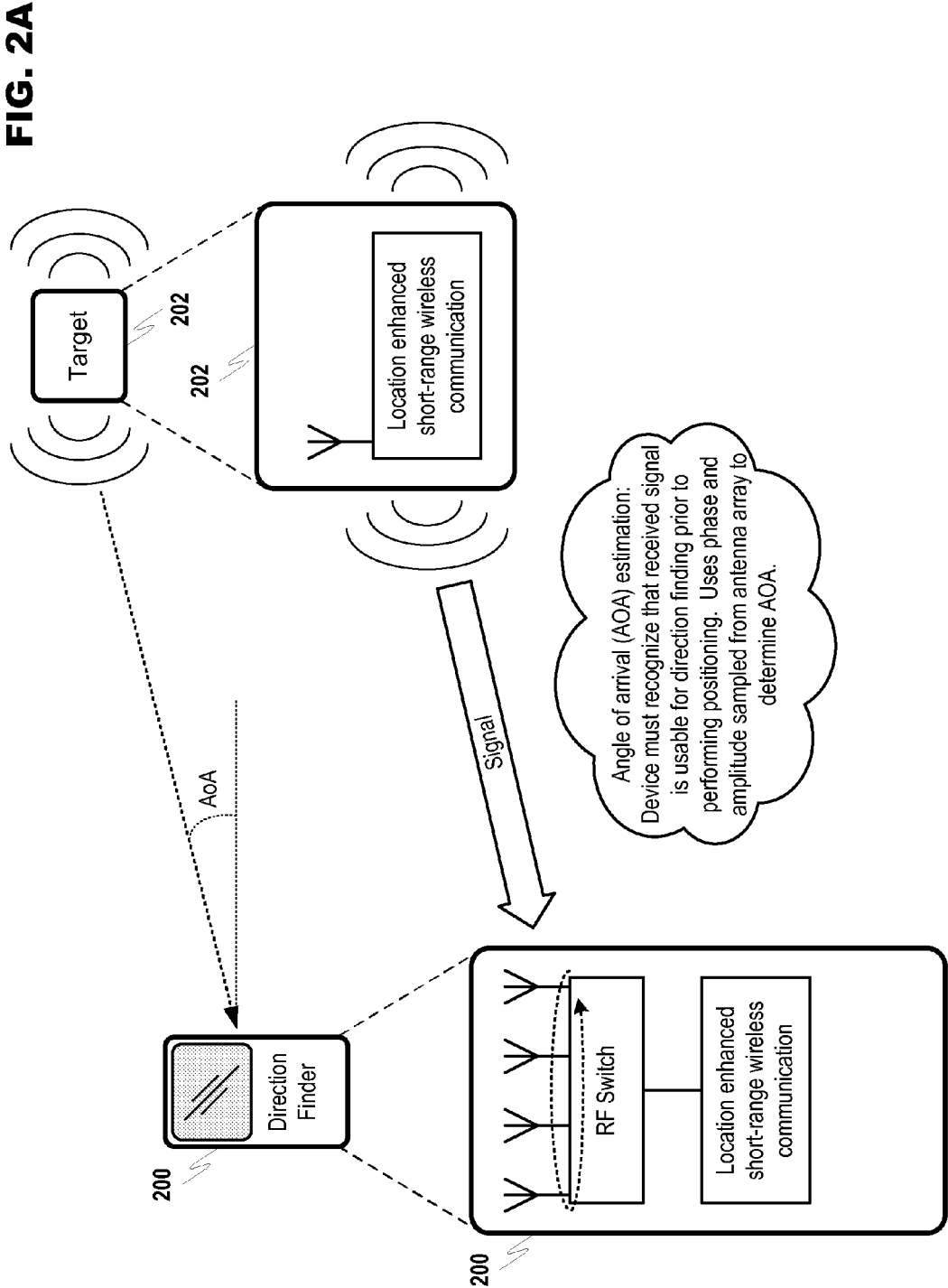

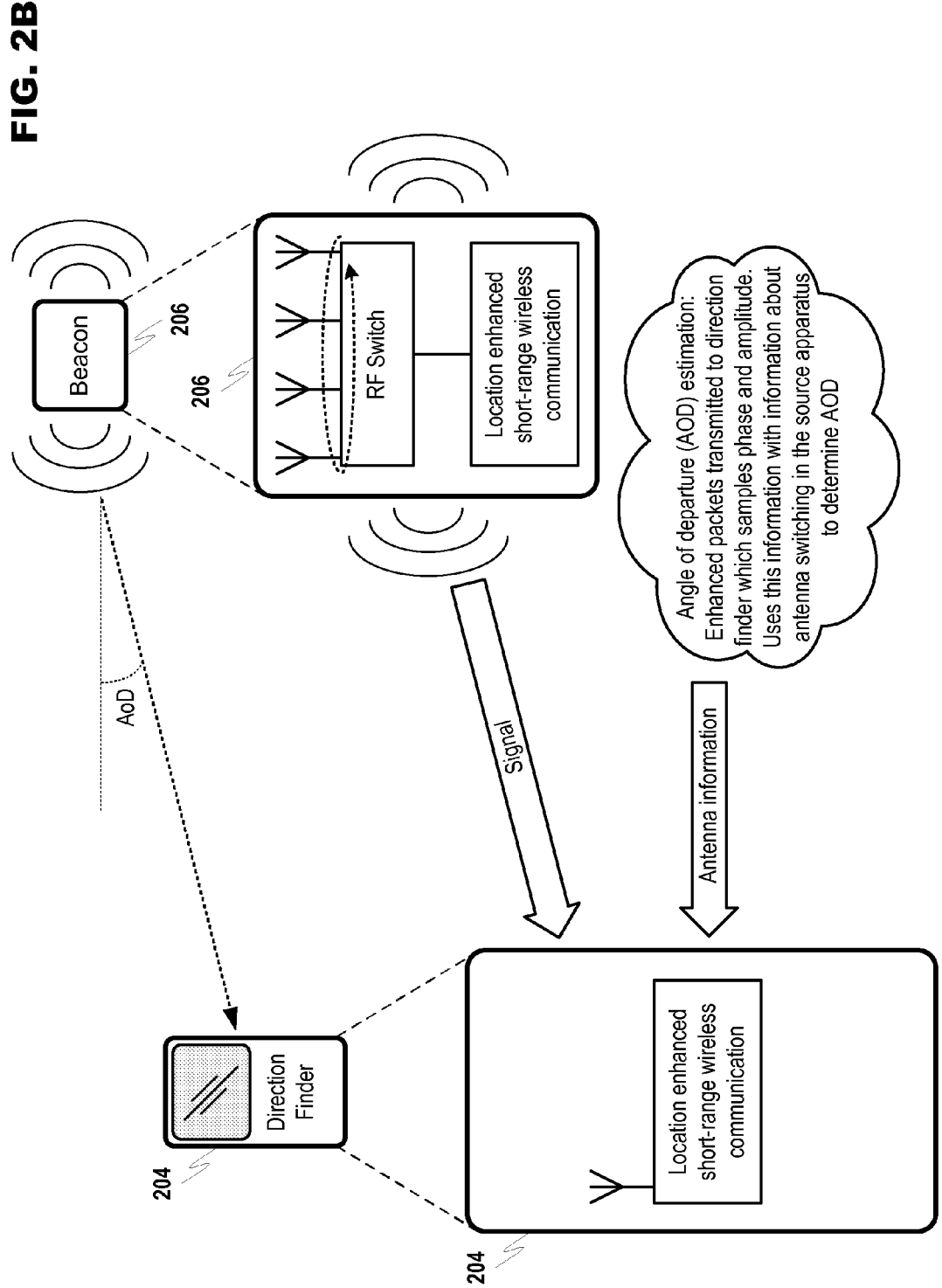

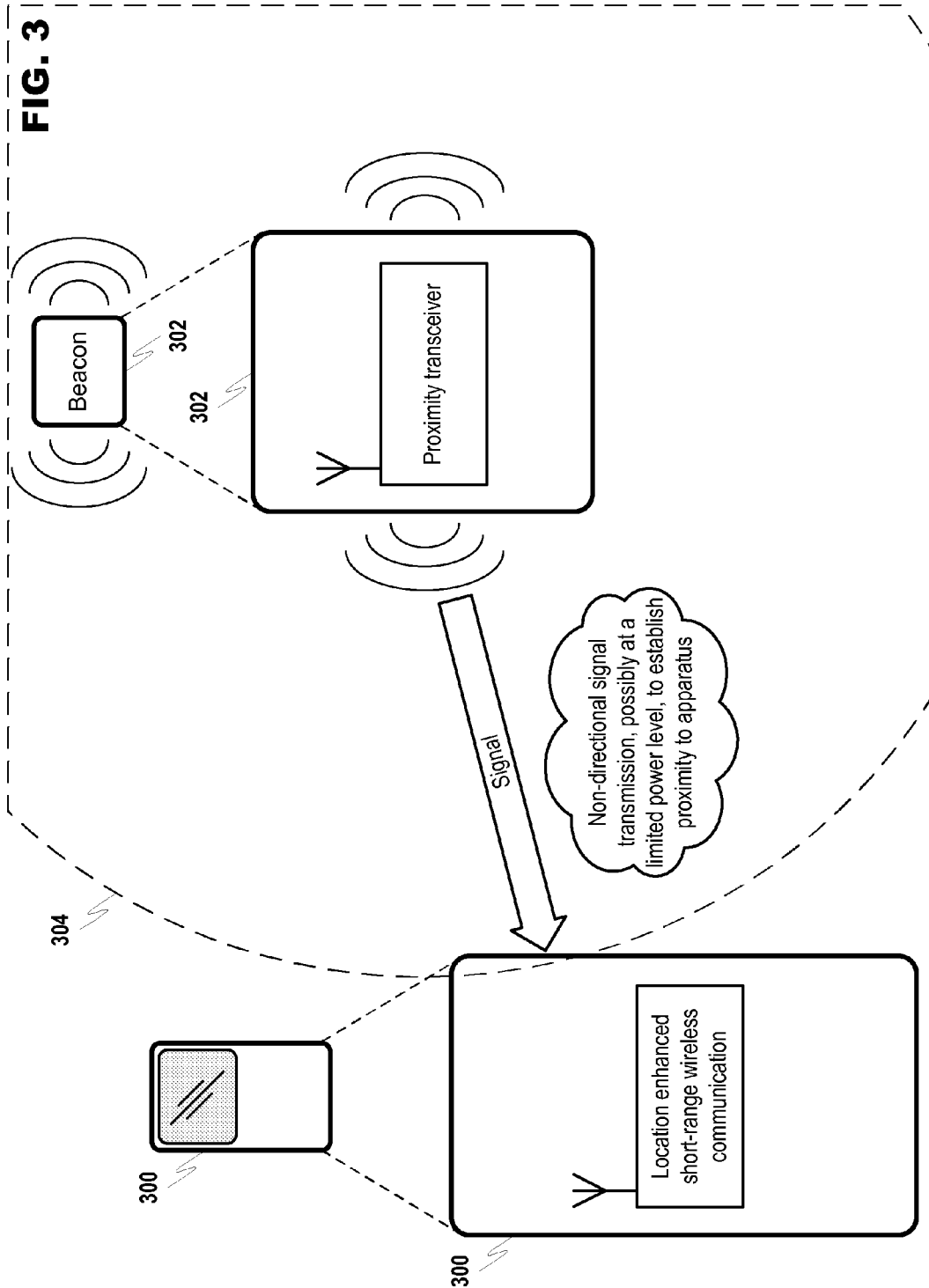

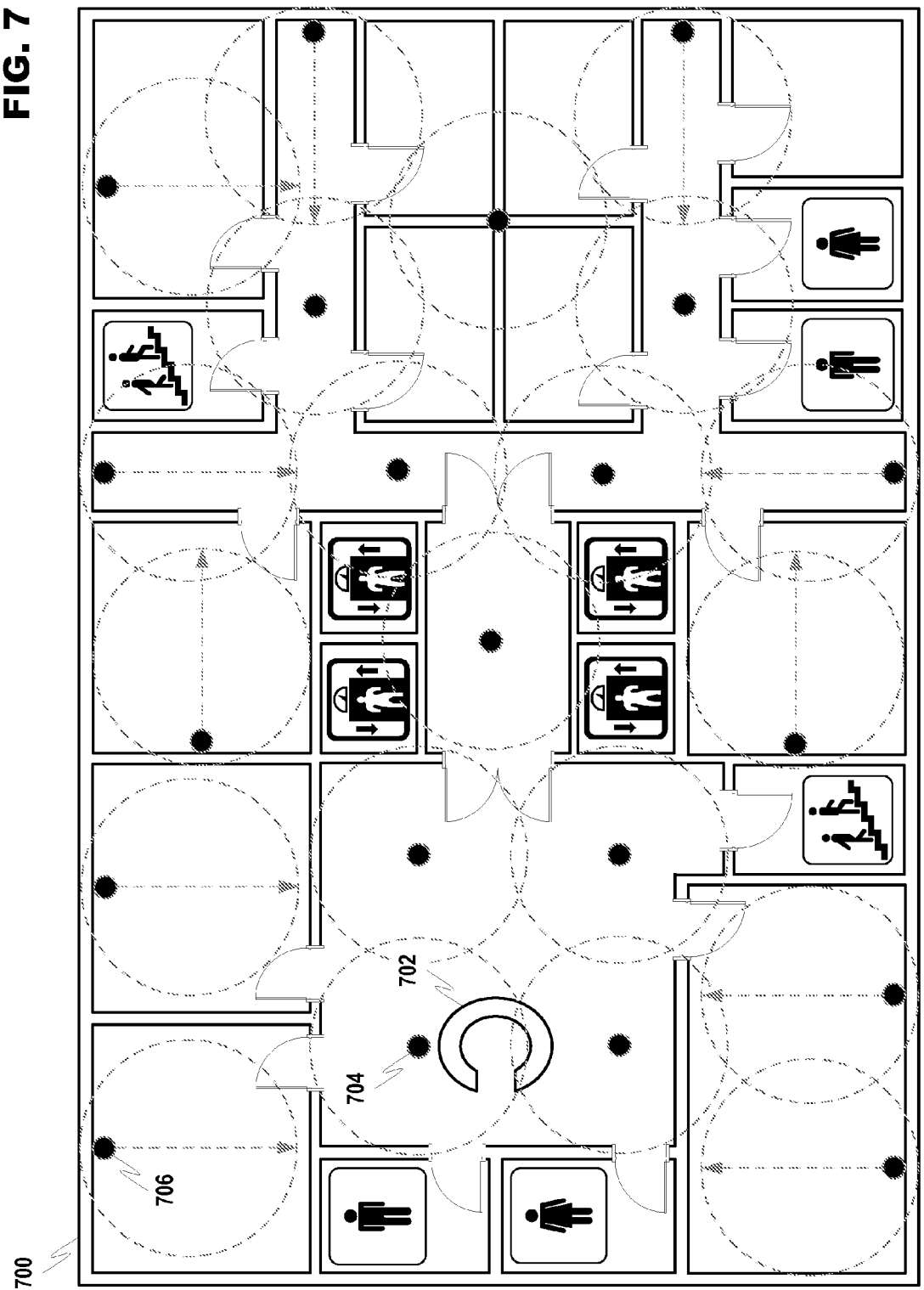

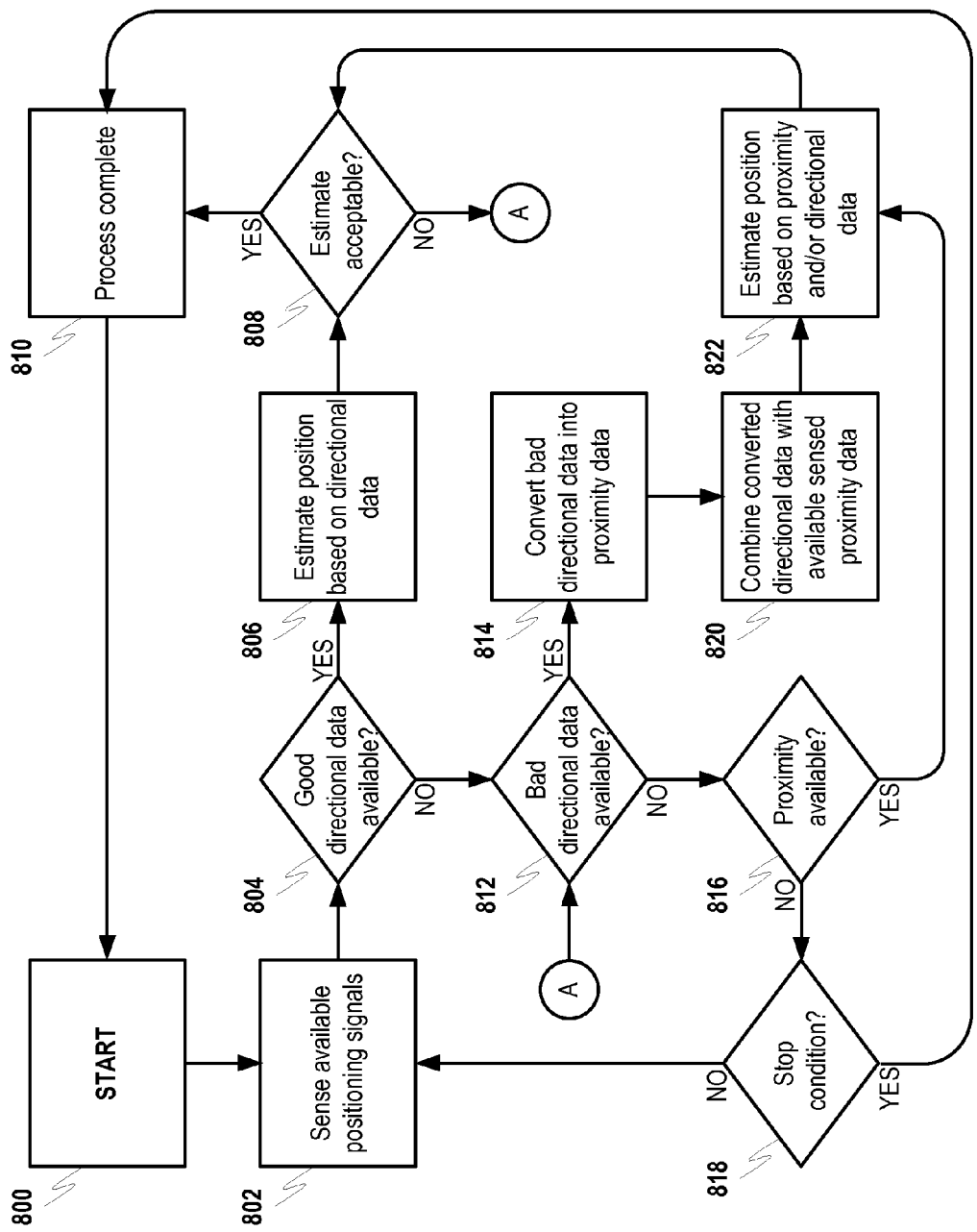

DIRECTIONAL POSITIONING AUGMENTED BY PROXIMITY INFORMATION

RELATED APPLICATION

This application was originally filed as Patent Cooperation Treaty Application No. PCT/IB2012/052780 filed Jun. 1, 2012 which claims priority benefit to U.S. Provisional Patent Application No. 61/492,965, filed Jun. 3, 2011.

This international application is based on and claims priority to U.S. Provisional Application Ser. No. 61/492,965, filed Jun. 3, 2011, entitled, "Directional Positioning Augmented by Proximity Information", and of which the entire contents are incorporated herein by reference.

BACKGROUND

1. Field of Invention

The present invention relates to wireless communication, and in particular, to the provision position estimation facilitated through a combination of different types of signal data.

2. Background

The desire for apparatuses to serve in a multitude of roles is driving designers to incorporate more functionality into emerging apparatuses. For example, wireless-enabled mobile devices are not only limited to the traditional conveyance of voice information during telephonic operations, but may also convey text, audio, video and other types of information for supporting a multitude of applications. Some applications may provide functionality on the surface that relies upon underlying wireless interaction for support. Obvious examples of such applications include programs that allow users to communicate directly with other users or resources, such as email, messaging services, Internet browsers, etc. There are also categories of applications that may provide services not directly related to user communication with other users or resources, but that still rely on underlying wireless exchange of information. Positioning-related services encompass a growing segment of applications that provide location services to users, such as mapping, route determination, tracking, etc., that rely upon wireless interaction for execution.

Positioning-related services may include known user-related applications, such as visual representations of locations or routes that may be displayed for users while underlying wireless communication is used to determine current apparatus position, direction, orientation, etc. However, other uses such as user/object tracking, location-specific social networking and commercial messaging, enhanced visual recognition, etc. are now becoming available that makes the ability to determine apparatus position a desirable feature to provide in mobile apparatuses. Positioning may be implemented using a variety of available technologies. For example, devices may incorporate global positioning system (GPS) receivers to receive signals from satellites for formulating an absolute (fixed) coordinate position. Terrestrial technologies (e.g., earth based cellular signals or short-range wireless interaction), while not as exact, may also be relied upon to resolve an absolute or relative (e.g., with respect to a signal source) apparatus position.

While GPS continues to be a popular positioning system for inclusion in wireless-enabled mobile apparatuses, it is a not viable solution for all circumstances. Implementing GPS requires dedicated hardware (e.g., a GPS receiver) and software. In mobile devices where every cubic millimeter of space may be allocated, circuitry dedicated to a single application may limit device design. GPS receiving subsystems also consume power and processing resources, which may be problematic in resource-limited mobile devices. With respect to performance, GPS may provide very accurate positioning information outdoors, but may exhibit unreliable performance in certain situations such as within structures (e.g., buildings) where physical barriers and other signal sources may cause interference impeding the ability of apparatuses to receive GPS signals.

SUMMARY

Various example embodiments of the present invention may be directed to a method, apparatus, computer program product and system for estimating apparatus position based on different types of positioning information. In at least one example implementation, an apparatus may sense wireless signals, and if the wireless signals are determined to comprise angular data meeting a certain criteria, the position of the apparatus may be estimated based on the angular data. Otherwise, if the apparatus determines that the wireless signals comprise at least one of angular data not meeting the certain criteria or proximity data, the position of the apparatus may estimated based on proximity data derived from the sensed wireless signals.

In accordance with at least one embodiment of the present invention, the certain criteria may comprise at least one of a minimum sensed signal power level and a type of angular data. In instances where the apparatus determines that the sensed angular data does not meet the certain criteria, estimating apparatus position based on proximity data derived from the sensed wireless signals may comprise converting any sensed angular data not meeting the certain criteria into proximity data. The proximity data resulting from the conversion of the angular data not meeting the certain criteria may be combined with any sensed proximity data, and apparatus position may be estimated based on the combined proximity data.

After an apparatus position has been estimated in accordance with at least one embodiment of the present invention, the apparatus may make a further determination as to whether the position estimation is acceptable. If the position is determined to be unacceptable, the apparatus may further determine if the wireless signals sensed at the apparatus comprise at least one of angular data not meeting the certain criteria or proximity data. The apparatus may then convert any sensed angular data not meeting the certain criteria into proximity data and may combine any proximity data resulting from the conversion of the angular data with any sensed proximity data. The apparatus may then formulate a new position estimate based on the angular data meeting the certain criteria and the combined proximity data.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 2A discloses an example of angle-of-arrival (AoA) positioning in accordance with at least one embodiment of the present invention.

FIG. 2B discloses an example of angle-of-departure (AoD) positioning in accordance with at least one embodiment of the present invention.

FIG. 3 discloses an example of proximity positioning in accordance with at least one embodiment of the present invention.

FIG. 7 discloses an example of an operational environment wherein positioning information is available in accordance with at least one embodiment of the present invention.

FIG. 8 discloses a flowchart of an example communication process in accordance with at least one embodiment of the present invention.

DESCRIPTION OF EXAMPLE EMBODIMENTS

Figure 1A:
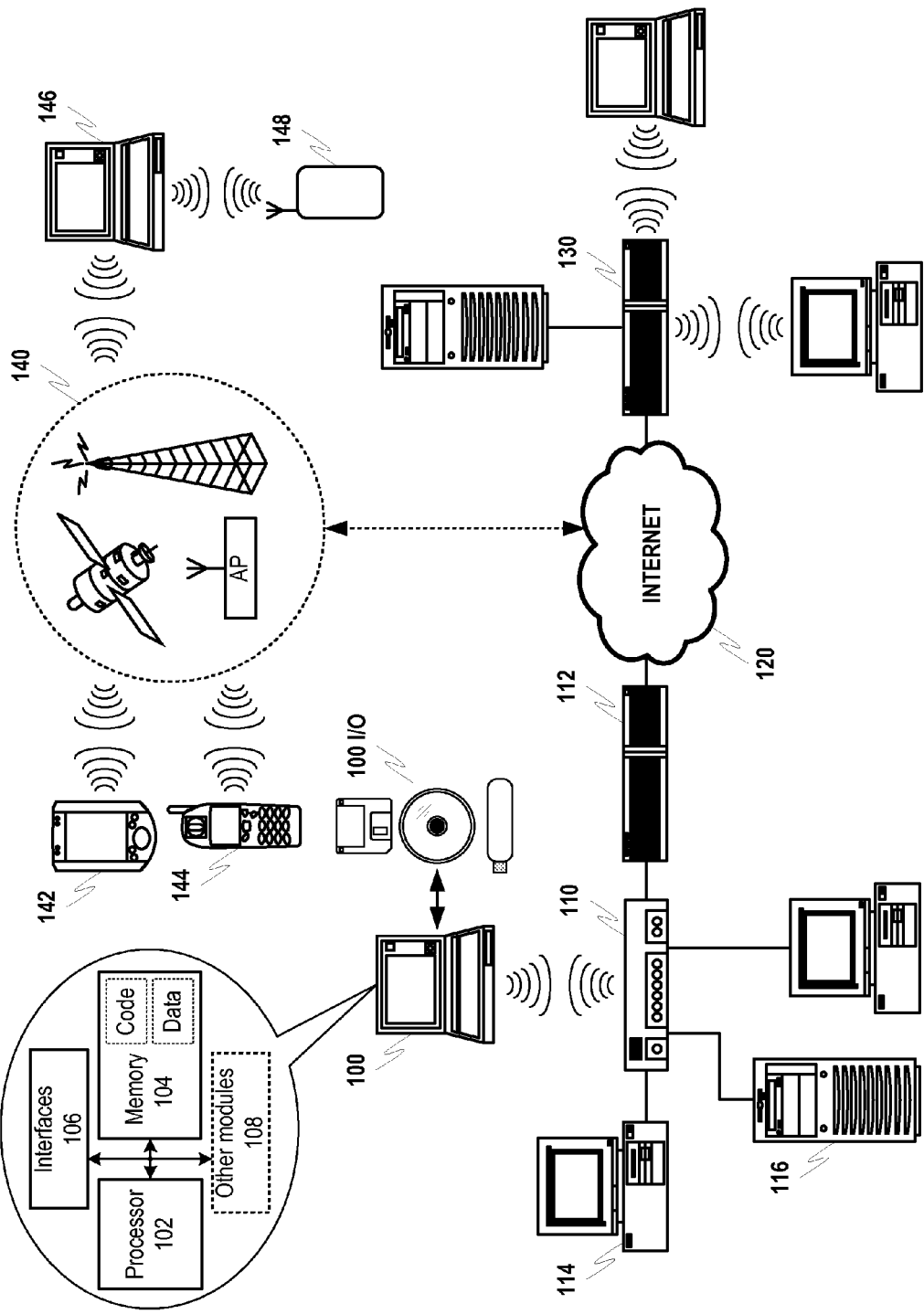
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with Which Embodiments of the Present Invention may be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Examples of Apparatus Positioning

Positioning in apparatuses may be supported, in whole or in part, through the use of combinations of hardware interfaces and/or software applications such as previously described with respect to FIG. 1A-1B. For example, Global Positioning System (GPS) receivers may be incorporated in apparatuses and may be integrated with the aforementioned apparatus resources for receiving signals that may be used to derive coordinates corresponding to apparatus location. However, the integration of a GPS receiver may not provide an ideal solution for all situations. For example, implementing a dedicated GPS receiver may require space for a receiver chipset along with processing/energy resources for operating the receiver, which may prove problematic in smaller/simpler apparatuses. GPS signals may also not be reliable, or even available, in some situations (e.g., when operating inside a structure like a building). As a result, other positioning modes being available in an apparatus may be beneficial for situations not well-suited for GPS.

FIG. 2A and 2B disclose examples of positioning via electronic direction-finding, while FIG. 3 discloses an example of positioning via proximity detection, that may be employed in accordance with various embodiments of the present invention. For the sake of explanation in these figures, apparatuses 200-202, 204-206 and 300-302 may interact via a short-range wireless communication medium. Example short-range wireless communication mediums that are well-known include Bluetooth and Wireless Local Area Networking (WLAN) in accordance with the IEEE 802.11 specification. However, alternative wireless communication mediums may also be employed depending on the particular apparatus, application, operating environment, etc. For example, limited space, processing and/or power resources in apparatuses may be accommodated by a lower power consumption (and capacity) wireless communication medium like Bluetooth Low Energy (BLE). BLE has been integrated into the Bluetooth Core specification v4.0 and provides a lightweight Link Layer capable of providing ultra-low power idle mode operation, simple device discovery, and reliable point-to-multipoint data transfer with advanced power-save and secure encrypted connections at the lowest possible cost. The discussion of any of these wireless communication mediums in accordance with at least one embodiment of the present invention is not intended to be limiting, and is presented only for the sake of explanation herein.

FIG. 2A discloses an example scenario wherein apparatus 200 may estimate the angle of arrival (AoA) of a communication signal received from apparatus 202. In the course of this estimation, various amplitude and phase samples for the signal may be measured at each antenna in an antenna array residing in apparatus 200. Amplitude and phase measurements may be recorded by cycling an RF switch through each antenna in the array. Receiving apparatus 200 may then estimate an AoA for the signal using the recorded samples and parameters related to the antenna array. The antenna array parameters may pertain the composition, configuration and placement of antennas within the antenna array, and may be set in the device, for example, as part of the apparatus manufacturing process. As further set forth in FIG. 2A, apparatus 200 must be able to identify that a signal is usable for performing AoA estimation prior to initiating the process. The usability of a signal may depend on apparatus 200 knowing what signal content to measure, including at least the length of the signal content to measure and possibility even a bit pattern contained in the signal content. The ability to communicate this signal information may depend upon the particular wireless communication medium being employed (e.g., may be limited when using Bluetooth LE due to the low overhead, and thus capacity, of the medium).

FIG. 2B discloses an example of apparatus 204 performing angle-of-departure (AoD) estimation for a signal transmitted from apparatus 206. In such a configuration apparatus 206 may transmit AoD enhanced packets and may execute antenna switching during the transmission of the packet. Apparatus 204 may scan for the AoD enhanced packets and may execute amplitude and phase sampling during reception of these packets. Apparatus 204 may then utilize the amplitude and phase samples, along with antenna array parameter information, to estimate the AoD of the packet from apparatus 206. In accordance with at least one embodiment of the present invention, some of the fixed parameters related to the physical configuration of the antenna array in apparatus 206 may be obtained from a remote resource, such as via a wired or wireless link to the Internet. While the positioning solution provided in FIG. 2B may allow for position estimation to be carried out in an apparatus that may not contain its own dedicated position hardware and/or software, apparatus 204 must be aware that the packets in the signal transmitted by apparatus 206 are AoD enhanced packets prior to initiating the AoD estimation.

An example of a proximity-based positioning system usable in indoor operational environments is disclosed in FIG. 3. One or both of apparatus 300 and beacon 302 may include proximity transceivers that may send or receive wireless signals usable for measuring apparatus proximity. For example, beacon 302 may periodically transmit signals receivable by apparatus 300. Upon receiving a signal transmitted from beacon 302, apparatus 300 may at least know that it is within transmission range of beacon 302. However, this is a very rudimentary operation in that the precise position of apparatus 300 may only be narrowed to the broadcast radius of the beacon 302. The signal strength 304 of beacon 302 may be limited so that it only covers a small area, which may increase positioning resolution. However, such a change may be prohibitive as it would necessitate many more beacons 302 in order to cover the full operational environment.

The location estimation for apparatus 300 may be refined by introducing received signal strength (RSS) sensing for signals received from beacon 302. For example, beacon 302 (e.g., an AP in a WLAN network) may transmit signals including AP identification information that can be measured by apparatus 300 (e.g., a mobile device), and based on the RSS measured from several APs 302, mobile device 300 may estimate its location relative to the measured AP locations. A global location reference (e.g., the location of apparatus 300 within the operational environment occupied by one or more apparatuses 302) may then be computed based on operational environment information available from a database mapping the location of each AP 302 within the space. More specifically, after apparatus 300 defines its position with respect to one or more apparatuses 302, and defines the position of apparatuses 302 within the operational environment, apparatus 300 may then extrapolate its position in the operational environment.

However, positioning based on RSS measured at apparatus 300 may suffer from substantial variance in measured RSS values caused by obstacles on the radio propagation path. An example of a problematic situation is providing electronic positioning within a structure such as a building. While positioning within a building will be utilized for the sake of explanation herein, the various embodiments of the present invention are not limited only to implementation in this specific application. Almost any situation wherein traditional positioning techniques do not provide adequate performance (e.g., speed, resolution, etc.) may experience improvement through the following example embodiments and/or implementations of the present invention.

III. Examples where Directional and Proximity Positioning Information may be used Together In accordance with at least one embodiment of the present invention, benefits may be realized by leveraging the abilities of both directional-based and proximity-based positioning in a combined positioning solution. Some benefits may include enhanced resolution without the need to completely upgrade an existing system, the flexibility to economize an installation based on combining lower and higher cost technologies, positioning solutions with better interference immunity and failure tolerance, etc. However, given the technologies and methodologies in use today, there are also challenges to overcome when implementing a combined positioning system. These challenges include how to still utilize low accuracy angular estimation information (e.g., when angular estimation is not reliable on its own, but the angular data may still be used for a rough position estimate), continued use of proximity transceivers (PT) in certain circumstances (e.g., when it may not be feasible to install relatively complex, expensive, etc. multi-antenna directional transceivers (DT) over an entire area, especially when it may be sufficient to identify presence in an area and not an exact location), and how to represent information provided by PTs depending on antenna characteristic, mounting (e.g., on a wall or ceiling) etc. These issues must be considered because structures, sources of interference, etc. present in indoor environments make positioning complex. In practice, when implementing indoor positioning there may be areas where the use of a PT may be more convenient (e.g., in terms of deployment, installation cost, etc.) than using a DT. Hence, enabling indoor positioning, in accordance with at least one embodiment of the present invention, may employ a combination of positioning technologies.

Figure 4:
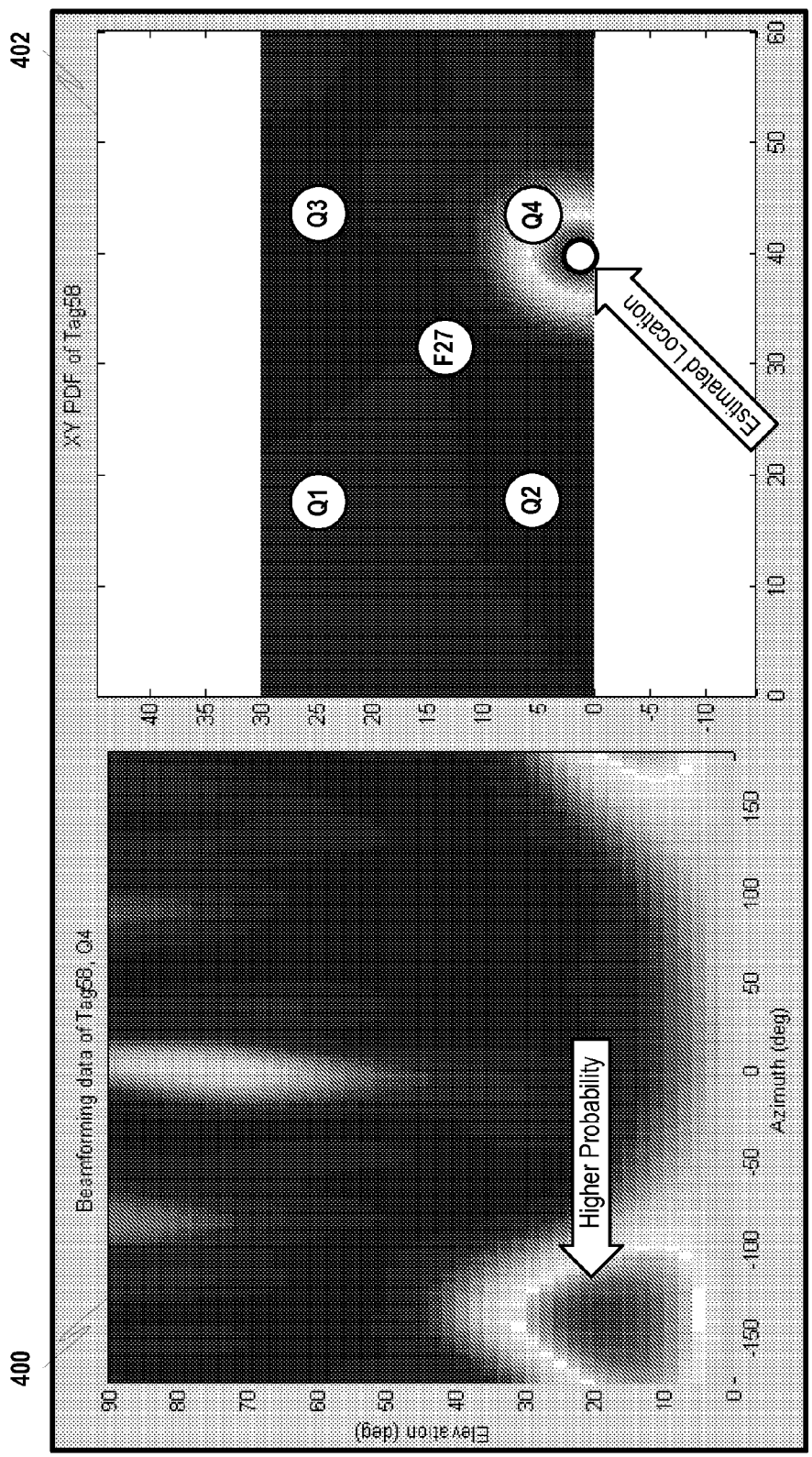
FIG. 4 discloses an example of sensed directional data in accordance with at least one embodiment of the present invention.

In accordance with at least one embodiment of the present invention, the location of an object may be estimated using different types of transceivers. Moreover, lower-accuracy information (e.g., from proximity measures) may be exploited in order to improve the accuracy and reliability of angular-based positioning. In normal angular estimation, a grid (with point spacing being usually from 0.1 m to 1 m) in XY domain may be used to cover the whole area of interest. The value at each grid point is proportional to the probability that user is at the position of that grid point. Using this approach all the data from the different DTs may be combined by simply summing the grid point values from different beacons. The location estimate may then be obtained by finding the point having the highest probability. FIG. 4 discloses an example of measured signal elevation and azimuth summation for a received directional signal. In FIG. 4 graph 400 discloses summing measured elevation and azimuth values for a sensed directional signal in order to determine the highest probability. As indicated in graph 400 by the arrow, an area of higher probability may then be identified to estimate the most probably elevation and azimuth values for the signal. These probabilities are translated to the XY domain in graph 402. The locations of various example transceivers are shown (e.g., Q1-Q4 and F27), and a location corresponding to the area having the highest probability from graph 400 is indicated by a white dot and an arrow labeled "estimated location." The dot is the estimated location of the object.

Figure 5:
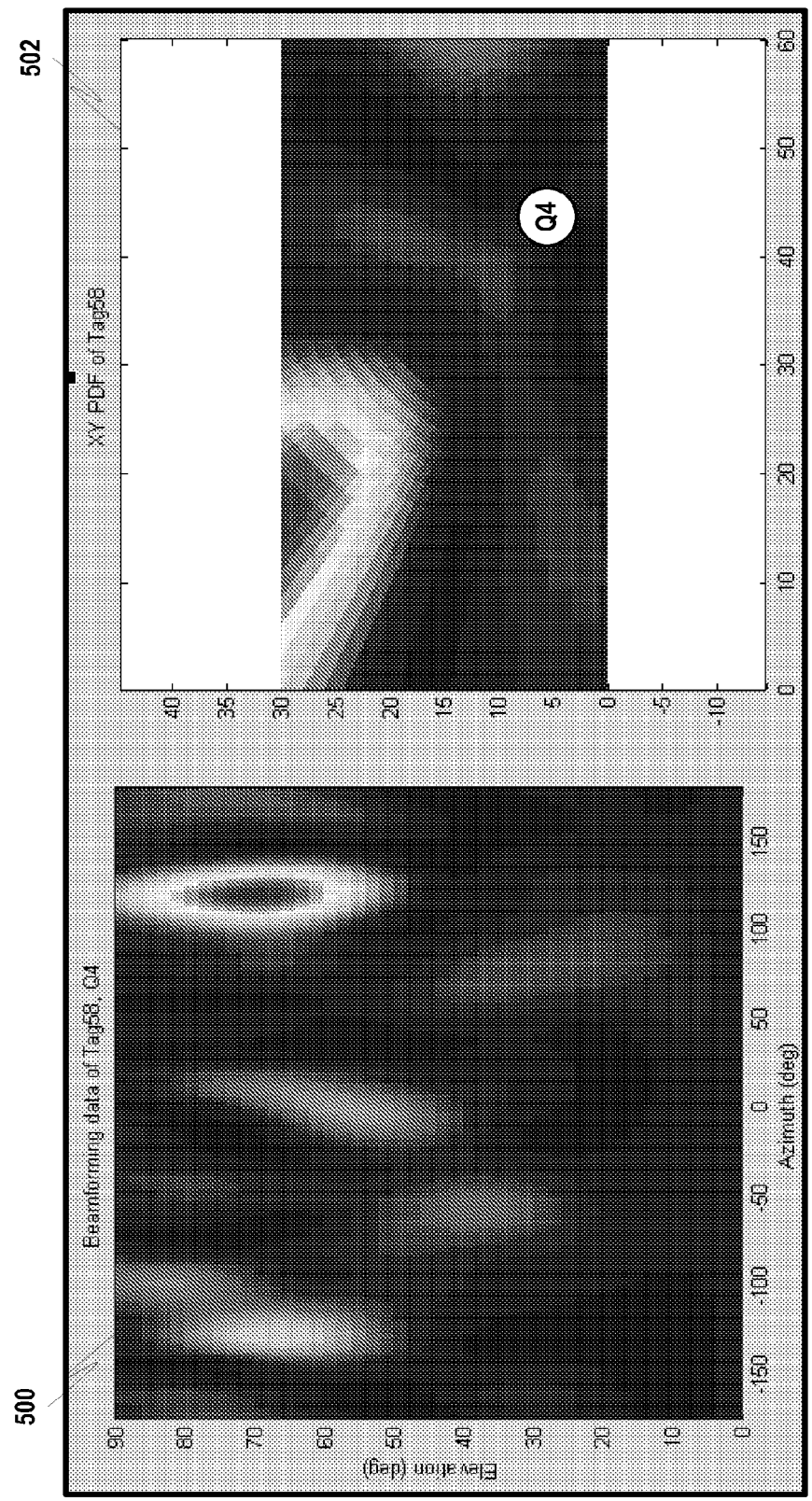
FIG. 5 discloses another example of sensed directional data in accordance with at least one embodiment of the present invention.

FIG. 5 discloses a further example of angular data sensed from a high elevation. Similar to graph 400, in graph 500 an elevation and azimuth for a signal sensed at an apparatus from a DT is disclosed. The area of higher probably is disclosed by the arrow. This information is then represented in the XY space in graph 502, wherein a white dot and an arrow disclose the most probable location for the object (e.g., the apparatus).

Figure 6:
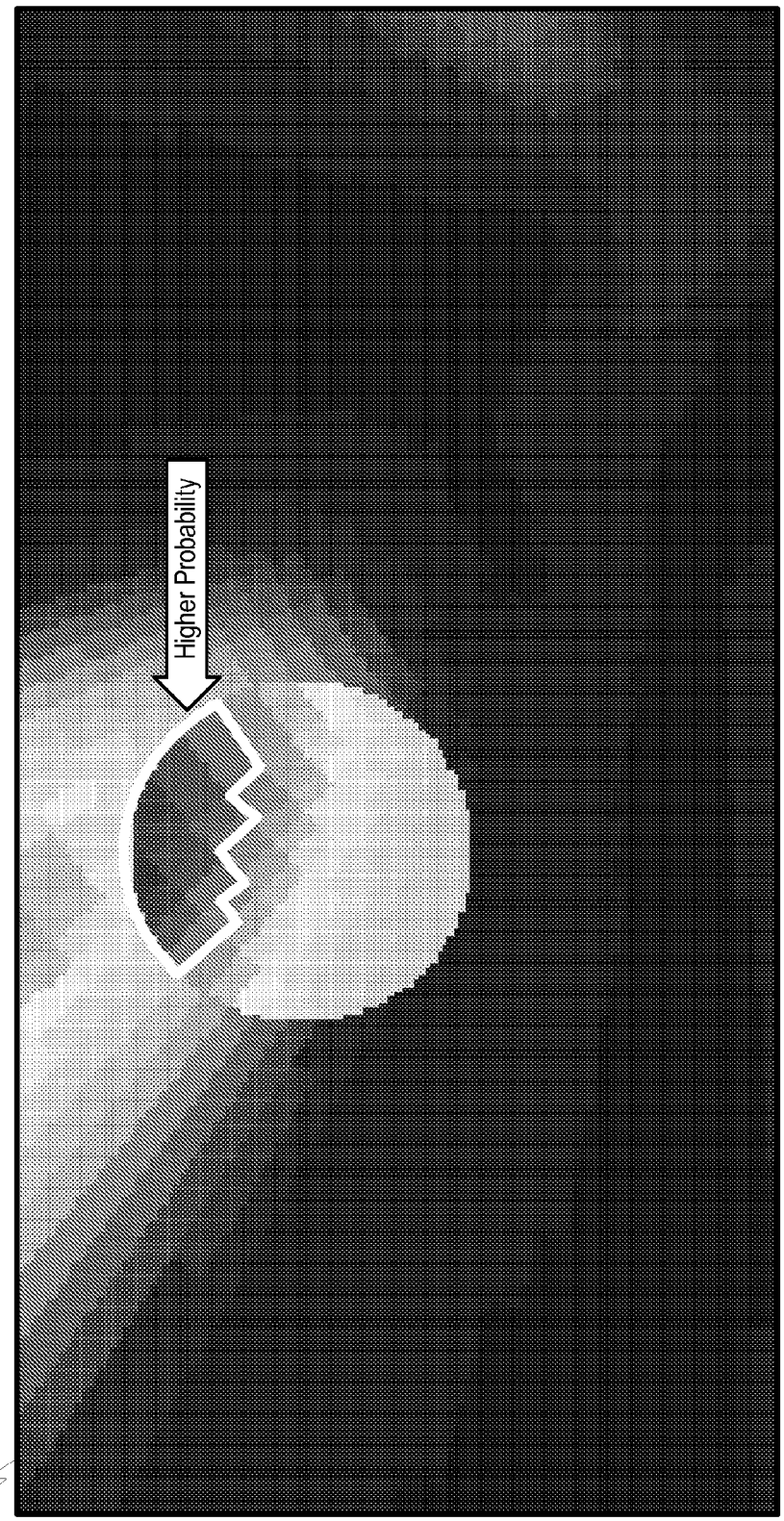
FIG. 6 discloses an example of the effect of combining sensed directional and proximity data in accordance with at least one embodiment of the present invention.

In accordance with at least one embodiment of the present invention, directional information, such as depicted in FIG. 5, may be combined with proximity information to further refine a positional estimation. If an apparatus (e.g., a mobile device) receives a signal from a single antenna PT, it can be assumed that the apparatus is located within an area defined by the transmission range of the PT. Transmission range may depend on, for example, the transmission power and the installation height of the PT. Since the PT signal can be easily blocked by walls, the human body, furniture etc., more reliable estimates (e.g., higher resolution) may be obtained by using very low transmit power so that in no condition the signal can be received more than a certain distance (e.g., 5 m) away from the PT. An example of the combination of directional and proximity information is disclosed in FIG. 6. Graph 600 is a close-up of graph 502, wherein the probability data of graph 500 has been mapped into the XY space. The addition of proximity information into graph 600 is reflected by a circular region that specifies an area (e.g., based on the transmission power of the PT) in which the apparatus may be located. The intersection of the directional and proximity estimates is then described by the white outlined area with the arrow indicating "higher probability" in graph 600. In particular, overlaying the proximity information over the directional information has defined a more specific area of directional information in which the apparatus may reside, and thereby refining the estimate based only on directional data.

FIG. 7 depicts an example of a combined DT and PT installation in building 700. For example, a PT 704 resides near reception desk 702. A signal sensed by an apparatus from PT 704 may indicate, by itself, that the apparatus is within the area defined by the dashed circle around PT 704. Thus the estimate could be presented with a circle centered at the beacon having a radius of 5 m. As stated above, changing the transmission power of PT 704 may increase or decrease the size of the area in which the apparatus may reside, and thus, may alter the resolution of the positioning estimate. However, the proximity information from PT 704 may be combined with directional information from DT 706 in order to refine the estimation. If higher power is used, then, in accordance with at least one embodiment of the present invention, the apparatus receiving the packets should check the received power and only accept packets where it is high enough.

While in normal angular based estimation we can use the point corresponding to the maximum probability, when proximity data is used in the way mentioned above, a range of points that are within the maximum power may be selected (e.g., points which have at least 80% as high probability as the maximum). The location may then be estimated as the center of mass of the selected points. Accuracy estimates can be taken from the area covered by these points. In practice it might be simplest to generalize the location as a circle displayed on a map, wherein the area defined by the radius of the circle may correspond to the area covered by the grid points (e.g., the same area, proportional, etc.). In cases when the 80% probability points form regions that are not overlapping, such as when signals are received from two beacons that are more than twice the coverage radius apart from each other, additional actions may be needed. For example, the data may be discarded as the estimate is probably not very accurate. Alternatively, a circle big enough to cover all the different 80% probability regions may be displayed on the apparatus. An apparatus user may then determine, based on the large size of the circle, that the estimate is not very exact, and that apparatus adjustment or moving to another location may be in order.

Directional signals that are received from DTs may also be converted to proximity data when, for example, high position accuracy is not necessary. Utilizing directional data in this manner may conserve apparatus resources as proximity-based position estimation requires much less processing. Also, in situations where directional signals having "questionable" quality are received (e.g., directional signals whose accuracy is questionable based on low power levels, bad content integrity checking results, etc.), it may be beneficial to convert these signals to proximity information (e.g., based on their power level and the location of the DT) for use in positioning estimation alone or in combination with "good" directional data and proximity data sensed from actual PTs. In accordance with various embodiments of the present invention, an apparatus (e.g. mobile device) may receive directional and/or proximity signals from various transceivers and may estimate the position of the apparatus alone or with the assistance of an external resource (e.g., for resource constrained apparatuses). For example, some or all of the processing for the directional and/or proximity signals may be performed by another apparatus (e.g., a server) in communication with the apparatus, wherein some or all of the results of the estimation may then be transmitted to the apparatus upon completion.

A flowchart of an example positioning process, in accordance with at least one embodiment of the present invention, is disclosed in FIG. 8. The process may initiate in step 800 and may then proceed to step 802 wherein one or more positioning signals may be sensed by an apparatus that desires to estimate its own position (e.g., either by itself or with the assistance of remote resources like a wirelessly-coupled server). A determination may then be made in step 804 as to whether the sensed positioning signals comprise good directional (e.g., angular) data. Good directional data, as determined in step 804, is data that may be relied upon for performing position estimation, wherein the determination may be made based on, for example, the power level of the directional data signal, an integrity check (e.g., CRC check) of the contents of the data signal, etc. If a determination is made that the signal comprises good directional data, then the process may proceed to step 806 wherein the position of the apparatus may be estimated based on the directional data. In step 808 further determination may then be made as to whether the position estimate is acceptable (e.g., whether the position estimate appears accurate, whether the size of the area in which the apparatus in estimated provides adequate positioning resolution, etc.). If in step 808 the position estimate is deemed to be acceptable, the process may terminate in step 810 and may reinitiate in step 800 (e.g., in preparation for further positioning requests).

If it is determined that no good directional data has been received in the apparatus in step 802, or if the position estimate is determined not to be acceptable in step 808, the process may then move to step 812 wherein a determination may be made as to whether bad directional data (e.g., directional data not suitable for processing a directional position estimation) has been received in the apparatus. If it is determined in step 812 that bad directional data was received, then in step 814 the bad directional data may be converted into proximity data in step 814. The conversion of directional data to proximity data may comprise, for example, estimating an area surrounding the DT in which the apparatus may reside based on the sensed power level of the directional data signal. The process may then proceed to step 820 wherein the proximity data resulting from the conversion of the bad directional data may be combined with any proximity data sensed by the apparatus in step 802. The position of the apparatus may then be estimated based on at least the combined proximity data in step 822. In the instance that good directional information was determined to be available in step 804, but the estimate based on only the good directional information was determined to be unacceptable in step 808, the estimate in step 822 may be based on the good directional information, any converted bad directional information (now proximity information) and any sensed proximity information. The process may the return to step 808 to determine whether the apparatus position estimated in step 822 is acceptable.

If in step 812 it is determined that no bad directional data is available, the process may move to step 818 where a further determination may be made as to whether proximity data is available. If no proximity data is determined to available, then the negative results of steps 804, 812 and 816 may be deemed to indicate that no positioning signals were received in step 802. The process may then move to step 818 wherein a determination whether a stop condition has occurred. Example stop conditions may include a timeout from sensing positioning signals, a number of signals received by the apparatus, an apparatus condition (e.g., power level), etc. If in step 818 it is determined that a stop condition exists, the process may be complete in step 810 and may reinitiate in step 800. Otherwise, if it is determined that a stop condition does not exist, the process may continue to listen for positioning signals in step 802. Returning to step 816, if a determination is made that proximity data is available, the process may proceed to step 822. In step 822 the position of the apparatus may be estimated based on the positioning data available to the apparatus, the available positioning data comprising at least sensed proximity data and may further include good directional data and/or proximity data resulting from the conversion of bad directional data. The process may then return to step 808 to determine the acceptability of the position estimation. The process may then continue as set forth above with respect to step 808.

The various embodiments of the present invention are not limited only to the examples disclosed above, and may encompass other configurations or implementations.

At least one example embodiment of the present invention may also include an apparatus comprising means for sensing wireless signals at an apparatus, means for, if the wireless signals sensed at the apparatus are determined to comprise angular data meeting certain criteria, estimating apparatus position based on the angular data. and means for, if the wireless signals sensed at the apparatus are determined to comprise at least one of angular data not meeting the certain criteria or proximity data, estimating apparatus position based on proximity data derived from the sensed wireless signals.

At least one example embodiment of the present invention may also include electronic signals that cause an apparatus to sense wireless signals at an apparatus, if the wireless signals sensed at the apparatus are determined to comprise angular data meeting certain criteria, estimate apparatus position based on the angular data, and if the wireless signals sensed at the apparatus are determined to comprise at least one of angular data not meeting the certain criteria or proximity data, estimate apparatus position based on proximity data derived from the sensed wireless signals.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    sensing wireless signals at an apparatus;
    if the wireless signals sensed at the apparatus are determined to comprise angular data meeting certain criteria, estimating apparatus position based on the angular data; and
    if the wireless signals sensed at the apparatus are determined to comprise angular data not meeting the certain criteria, converting the angular data to proximity data, and estimating apparatus position based on the proximity data converted from the angular data in the sensed wireless signals.

2. The method of claim 1, wherein the certain criteria comprises at least one of a minimum sensed signal power level and a type of angular data.

3. The method of claim 1, wherein estimating apparatus position based on proximity data derived from the sensed wireless signals comprises converting any sensed angular data not meeting the certain criteria into proximity data.

4. The method of claim 3, wherein estimating apparatus position based on proximity data derived from the sensed wireless signals comprises combining proximity data resulting from the conversion with any sensed proximity data and estimating apparatus position based on the combined proximity data.

5. The method of claim 1, further comprising determining if the position estimated based on the angular data is acceptable; and
    if the position is determined to be unacceptable, determining if the wireless signals sensed at the apparatus comprise at least one of angular data not meeting the certain criteria or proximity data, converting any sensed angular data not meeting the certain criteria to proximity data, combining any proximity data resulting from the conversion with any sensed proximity data and estimating apparatus position based on any sensed angular data meeting the certain criteria and the combined proximity data.

6. A computer program product comprising computer executable program code recorded on a non-transitory computer readable medium, the computer executable program code comprising:
    code configured to cause an apparatus to sense wireless signals;
    code configured to cause the apparatus to, if the wireless signals sensed at the apparatus are determined to comprise angular data meeting certain criteria, estimate apparatus position based on the angular data; and
    code configured to cause the apparatus to, if the wireless signals sensed at the apparatus are determined to comprise angular data not meeting the certain criteria, converting the angular data to proximity data, and estimating apparatus position based on the proximity data converted from the angular data in the sensed wireless signals.

7. The computer program product of claim 6, wherein the certain criteria comprises at least one of a minimum sensed signal power level and a type of angular data.

8. The computer program product of claim 6, wherein the code configured to cause the apparatus to estimate apparatus position based on proximity data derived from the sensed wireless signals comprises code configured to cause the apparatus to convert any sensed angular data not meeting the certain criteria into proximity data.

9. The computer program product of claim 8, wherein the code configured to cause the apparatus to estimate apparatus position based on proximity data derived from the sensed wireless signals comprises code configured to cause the apparatus to combine proximity data resulting from the conversion with any sensed proximity data and estimate apparatus position based on the combined proximity data.

10. The computer program product of claim 6, further comprising code configured to cause the apparatus to determine if the position estimated based on the angular data is acceptable; and
    code configured to cause the apparatus to, if the position is determined to be unacceptable, determine if the wireless signals sensed at the apparatus comprise at least one of angular data not meeting the certain criteria or proximity data, convert any sensed angular data not meeting the certain criteria to proximity data, combine any proximity data resulting from the conversion with any sensed proximity data and estimate apparatus position based on any sensed angular data meeting the certain criteria and the combined proximity data.

11. An apparatus, comprising:
    at least one processor; and
    at least one memory including executable instructions, the at least one memory and the executable instructions being configured to, in cooperation with the at least one processor, cause the apparatus to perform at least the following:
    sense wireless signals;
    if the wireless signals sensed at the apparatus are determined to comprise angular data meeting certain criteria, estimate apparatus position based on the angular data; and
    if the wireless signals sensed at the apparatus are determined to comprise angular data not meeting the certain criteria, convert the angular data to proximity data, and estimate apparatus position based on the proximity data converted from the angular data in the sensed wireless signals.

12. The apparatus of claim 11, wherein the certain criteria comprises at least one of a minimum sensed signal power level and a type of angular data.

13. The apparatus of claim 11, wherein the at least one memory and the executable instructions being configured to, in cooperation with the at least one processor, cause the apparatus to estimate apparatus position based on proximity data derived from the sensed wireless signals comprises the at least one memory and the executable instructions being configured to, in cooperation with the at least one processor, cause the apparatus to convert any sensed angular data not meeting the certain criteria into proximity data.

14. The apparatus of claim 13, wherein the at least one memory and the executable instructions being configured to, in cooperation with the at least one processor, cause the apparatus to estimate apparatus position based on proximity data derived from the sensed wireless signals comprises the at least one memory and the executable instructions being configured to, in cooperation with the at least one processor, cause the apparatus to combine proximity data resulting from the conversion with any sensed proximity data and estimate apparatus position based on the combined proximity data.

15. The apparatus of claim 11, further comprising the at least one memory and the executable instructions being configured to, in cooperation with the at least one processor, cause the apparatus to determine if the position estimated based on the angular data is acceptable; and
 if the position is determined to be unacceptable, determine if the wireless signals sensed at the apparatus comprise at least one of angular data not meeting the certain criteria or proximity data, convert any sensed angular data not meeting the certain criteria to proximity data, combine any proximity data resulting from the conversion with any sensed proximity data and estimate apparatus position based on any sensed angular data meeting the certain criteria and the combined proximity data.

16. A system, comprising:
an apparatus; and
positioning transceivers;
the apparatus sensing wireless signals from the positioning transceivers, and if the wireless signals sensed at the apparatus are determined to comprise angular data meeting certain criteria, the apparatus further estimating position based on the angular data; and
the apparatus, if the wireless signals sensed at the apparatus are determined to comprise angular data not meeting the certain criteria, converting the angular data to proximity data, and estimating position based on the proximity data converted from the angular data in the sensed wireless signals.

17. An apparatus, comprising:
means for sensing wireless signals at an apparatus;
means for, if the wireless signals sensed at the apparatus are determined to comprise angular data meeting certain criteria, estimating apparatus position based on the angular data; and
means for, if the wireless signals sensed at the apparatus are determined to comprise angular data not meeting the certain criteria, converting the angular data to proximity data, and estimating apparatus position based on the proximity data converted from the angular data in the sensed wireless signals.

18. A method, comprising: sensing, by an apparatus, wireless signals at the apparatus;
 if the wireless signals sensed at the apparatus are determined to comprise angular data meeting certain criteria, estimating, by the apparatus, a position of the apparatus based on the angular data; and
 if the wireless signals sensed at the apparatus are determined to comprise angular data not meeting the certain criteria, converting, by the apparatus, the angular data to proximity data, and estimating apparatus position based on the proximity data converted from the angular data in the sensed wireless signals.

19. A non-transitory computer storage medium in which computer program code is stored, the computer program code causing an apparatus to perform the following when executed by a processor:
 to sense wireless signals at an apparatus;
 if the wireless signals sensed at the apparatus are determined to comprise angular data meeting certain criteria, estimate apparatus position based on the angular data; and
 if the wireless signals sensed at the apparatus are determined to comprise angular data not meeting the certain criteria, converting the angular data to proximity data, and estimating apparatus position based on the proximity data converted from the angular data in the sensed wireless signals.

* * * * *